(12) United States Patent
Kondo

(10) Patent No.: US 12,275,144 B2
(45) Date of Patent: Apr. 15, 2025

(54) JOINT STRUCTURE OF ROBOT

(71) Applicant: TOYOTA JIDOSHA KABUSHIKI KAISHA, Toyota (JP)

(72) Inventor: Hiroyuki Kondo, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/540,156

(22) Filed: Dec. 14, 2023

(65) Prior Publication Data
US 2024/0246227 A1 Jul. 25, 2024

(30) Foreign Application Priority Data

Jan. 19, 2023 (JP) ................................ 2023-006310

(51) Int. Cl.
*F16H 3/06* (2006.01)
*B25J 9/10* (2006.01)
*B62D 57/032* (2006.01)

(52) U.S. Cl.
CPC ............ *B25J 9/106* (2013.01); *B62D 57/032* (2013.01)

(58) Field of Classification Search
CPC ................................ B25J 9/106; B62D 57/032
See application file for complete search history.

(56) References Cited

U.S. PATENT DOCUMENTS

| 6,962,220 | B2 * | 11/2005 | Takenaka | B25J 19/0008 901/1 |
| 2004/0261561 | A1 * | 12/2004 | Takenaka | B25J 19/0012 74/490.01 |
| 2008/0210477 | A1 * | 9/2008 | Takenaka | B25J 19/0012 403/119 |
| 2013/0192406 | A1 * | 8/2013 | Godowski | B25J 9/106 901/1 |
| 2013/0336753 | A1 * | 12/2013 | Shimamoto | B25J 9/106 414/744.5 |
| 2015/0122559 | A1 * | 5/2015 | Nagatsuka | B25J 9/1065 901/1 |
| 2020/0139421 | A1 * | 5/2020 | Utsumi | B25J 9/106 |
| 2023/0339101 | A1 * | 10/2023 | Sugimoto | B25J 9/142 |

FOREIGN PATENT DOCUMENTS

JP 2009-47299 A 3/2009

* cited by examiner

*Primary Examiner* — Charles A Fox
*Assistant Examiner* — Gregory T Prather
(74) *Attorney, Agent, or Firm* — Oblon, McClelland, Maier & Neustadt, L.L.P.

(57) ABSTRACT

A joint structure of a robot according to the present disclosure includes: a first link whose one end is connected to a first member; a second link in which one end thereof is connected to the first link and an other end thereof is connected to a second member; and a first pivot that connects an other end of the first link to the one end of the second link. The joint structure also includes: a third link whose one end is connected to the first link at a position near the first pivot; and a slide part connected to the second link so as to be slidable. An other end of the third link is connected to the slide part.

3 Claims, 7 Drawing Sheets

JOINT STRUCTURE OF ROBOT

CROSS REFERENCE TO RELATED APPLICATIONS

This application is based upon and claims the benefit of priority from Japanese patent application No. 2023-6310, filed on Jan. 19, 2023, the disclosure of which is incorporated herein in its entirety by reference.

BACKGROUND

The present disclosure relates to a joint structure of a robot.

Japanese Unexamined Patent Application Publication No. 2009-47299 discloses a joint variable-speed drive mechanism for the purpose of realizing a joint capable of both high torque drive and high speed drive while reducing the load of a drive source. In the above variable-speed drive mechanism, a non-parallelogram link is formed by connecting a driving-side crank and an actuating-side crank by a rod, and when one crank is near a dead center, an angle formed by the other crank and the rod is made to about 90°, whereby the force transfer function is made to nonlinear. In the above variable-speed drive mechanism, according to the structure thereof, the joint can be driven at a high torque in a high-load posture and at a high speed in a low-load posture.

SUMMARY

However, in the technique disclosed in Japanese Unexamined Patent Application Publication No. 2009-47299, the range of motion of the joint is limited to about 90°, although the deceleration effect can be obtained in a high-load posture when driving the joint.

The present disclosure has been made in order to solve the above-described problem and an object thereof is to provide a joint structure of a robot by which a deceleration effect can be obtained in a high-load posture when driving a joint and a range of motion of the joint can be wide.

A joint structure of a robot according to the present disclosure includes: a first link, one end of the first link being connected to a first member; a second link, one end of the second link being connected to the first link and an other end of the second link being connected to a second member; a first pivot configured to connect an other end of the first link to the one end of the second link; a third link, one end of the third link being connected to the first link at a position near the first pivot; and a slide part connected to the second link so as to be slidable, in which an other end of the third link is connected to the slide part.

According to the present disclosure, it is possible to provide a joint structure of a robot by which a deceleration effect can be obtained in a high-load posture when driving a joint and a range of motion of the joint can be wide.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure will be described hereinafter through an embodiment of the present disclosure. However, the following embodiment is not intended to limit the scope of the present disclosure according to the claims. Further, all the components/structures described in the embodiment are not necessarily essential as means for solving the problem.

Embodiment

The following description will be given in accordance with the assumption that a joint structure of a robot according to this embodiment is applied as a joint to the knee of a target robot, that is, a mobile robot as a target mobile body, is a biped walking robot capable of walking on two legs. However, the present disclosure is not limited thereto.

First Configuration Example

Figure 1:
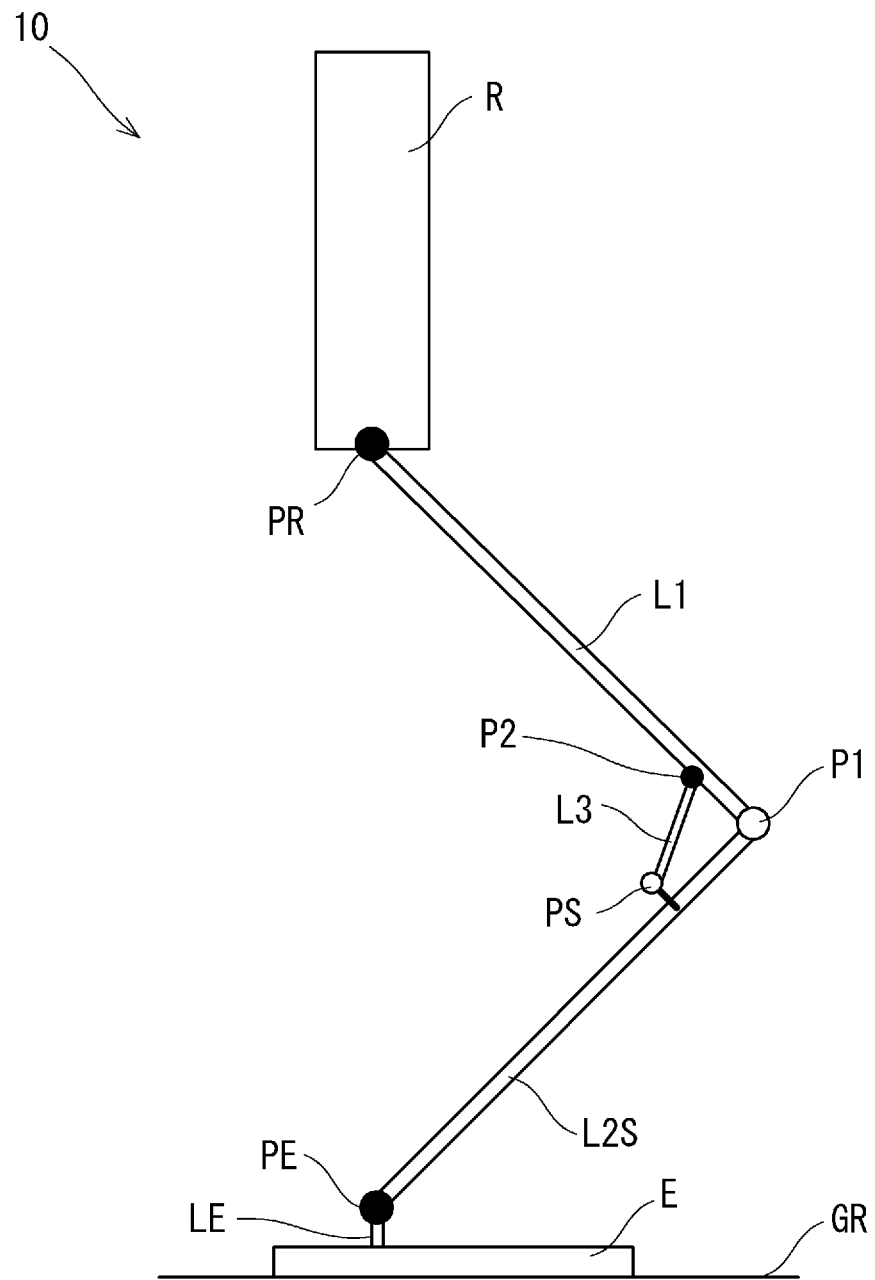
FIG. 1 is a schematic diagram showing a first configuration example of a joint structure of a biped walking robot according to an embodiment.

FIG. 1 is a schematic diagram showing a first configuration example of a joint structure of a biped walking robot according to this embodiment. As shown in FIG. 1, a joint structure 10 of the biped walking robot according to this embodiment includes a link L1, a slide link L2S, and a pivot P1. Further, the joint structure 10 may include a pivot PR, a link LE, and members R and E.

The link L1 is an example of a first link whose one end is connected to the pivot PR which is an example of a first member. The slide link L2S is an example of a second link in which one end thereof is connected to the first link and the other end thereof is connected to a second member and which slides a slide part, which will be described later. The pivot P1 is an example of a first pivot which connects the other end of the first link exemplified by the link L1 to the one end of the second link exemplified by the slide link L2S.

The description will be given in accordance with the assumption that the first member is the pivot PR. However, the first member may be a member which does not have a pivot function. In addition to the link L1, the member R can be rotatably connected to the pivot PR with respect to the link L1. Note that pivots such as the pivot PR and P1 and pivots PE and P2, which will be described later, serve as members for rotatably connecting members to each other such as links connected thereto.

As described above, one end of the slide link L2S is connected to the link L1 and the other end of the same is connected to the second member exemplified by the pivot PE. The description will be given in accordance with the assumption that the second member is the pivot PE. However, the second member may be a member which does not have a pivot function. In addition to the slide link L2S, the link LE can be rotatably connected to the pivot PE with respect to the slide link L2S. The member E can be connected to the link LE. Further, the pivot PE can be provided directly in the member E without the link LE being provided.

The joint structure 10 includes a link L3 and a slide pivot PS. The link L3 is an example of a third link in which one end thereof is connected to a position near the pivot P1 on the first link exemplified by the link L1, and the other end thereof is connected to the slide part exemplified by the slide pivot PS. The slide pivot PS is connected to the slide link L2S so as to be slidable. The slide pivot PS is an example of the slide part connected to the second link exemplified by the link L2S so as to be slidable.

The slide pivot PS may include a pivot rotatably connected to the link L3 and a link-like member extending from the pivot, and the link-like member may be installed on the slide link L2S so as to be slidable.

Further, in order to move the pivot P1, which is one of the joints, the joint structure 10 may include the pivot P2 rotatably connecting the link L3 to the link L1, and an actuator (not shown) that rotates the pivot P2. The pivot P2 is an example of a second pivot rotatably connecting one end of the third link to a position near the first pivot of the first link. The actuator that rotates the pivot P2 may be a rotary actuator composed of a motor in which a rotation axis is arranged at the center of the pivot P2.

Each pivot indicated by a black circle in FIG. 1 and FIGS. 2 to 4 described later, including the pivot P2, may be provided with a similar rotary actuator for rotating the pivot. As a matter of course, each pivot may be regarded as a rotary actuator itself provided at that position. Further, the actuator in each pivot is not limited to rotary actuator, and any mechanism that can be rotated in each pivot, such as a linear actuator configured to drive each drive joint, may be used.

The biped walking robot may be a robot including the joint structure 10 described above as a leg structure for each of the left and right legs. At this time, the member R corresponds to a body part commonly connected to the right and left legs, specifically, a body part commonly connected to the right and left pivot PRs. Further, the pivot PR corresponds to the hip joint, the pivot P1 corresponds to the knee joint, the member E corresponds to the foot, and the pivot PE corresponds to the top of the foot, for example, the ankle joint also referred to as the ankle joint. In other words, the pivots PR, P2, and PE may be provided with actuators for driving the hip joint, the knee joint, and the ankle joint, respectively. The member E as the foot is grounded to the ground GR at least in the stance. As a matter of course, the biped walking robot is not limited to the above-described leg-type robot, and it may also include other parts such as the arm(s) and the head.

As described above, in the joint structure 10 shown in FIG. 1, the pivot P1 can be applied so as to serve as a knee joint, which is a joint in which a load is increased. Further, as described above, the joint structure 10 includes a simple knee joint variable-speed structure, which connects the link L1 to the slide link L2S using the pivot P2, the link L3, and the slide pivot PS. The joint structure 10 is a simple knee joint variable-speed structure described above, and can be set so as to increase the deceleration ratio so that the torque of the actuator increases in a posture in which a joint load is high, and so that the deceleration ratio decreases as it becomes close to an upright posture and it can operate at a high speed. Note that the posture in which a load is high can refer to a squatting posture. The deceleration ratio herein refers to the ratio of the speed of the pivot P1 functioning as an output joint to an input speed of the actuator.

Further, as shown in FIG. 1 showing a ground GR and illustrating the member E as a foot, the pivot PR may be a member closer to the center of gravity of the biped walking robot than the pivot PE is. In particular, the above configuration is employed in the leg structure since it is desirable that the total mass be light and the mass distribution be light as it goes from the crotch part to the foot part of the leg. However, although the mass shifts away from the center of gravity compared to the first configuration example, a vertically reversed configuration of the configuration which comprises the links L1, L2S, and L3, the pivot P2, and the slide pivot PS in the first configuration example shown in FIG. 1 may be employed.

As described above, in the first configuration example, a deceleration effect can be obtained in a high-load posture when driving a joint and a range of motion of the joint can be wide without being limited to around 90°. Further, as can be seen from a second configuration example and a third configuration example described later, a similar effect can be obtained not only in the first configuration example but also in the following joint structure. That is, this joint structure includes a first link connected to a first member, a second link connected to the first link and to a second member, and a first pivot that connects the first link to the second link. This joint structure also includes a third link connected to the first link at a position near the first pivot, and a slide part connected to the second link so as to be slidable. Note that the third link is connected to the slide part.

Second Configuration Example

Figure 2:
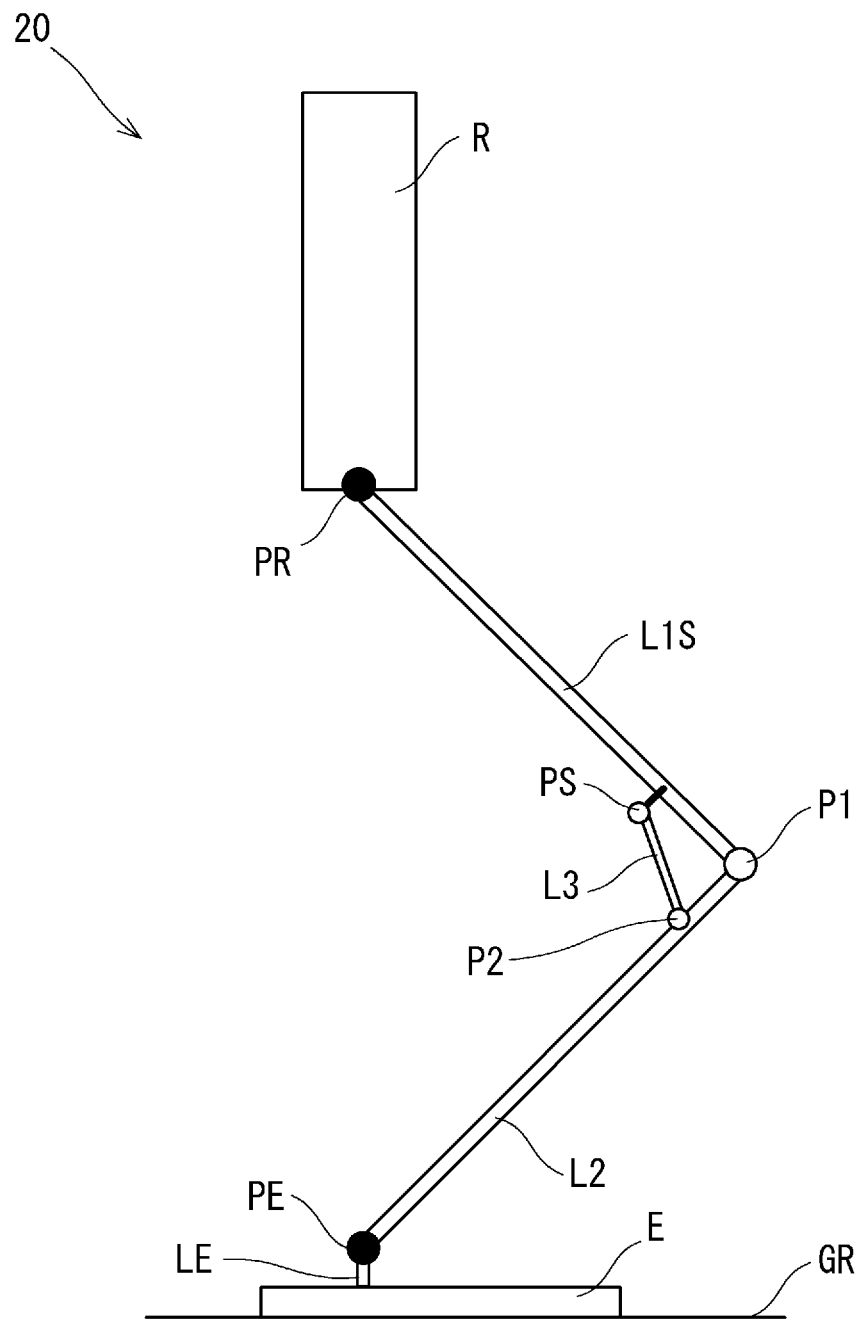
FIG. 2 is a schematic diagram showing a second configuration example of a joint structure of a biped walking robot according to the embodiment.

The second configuration example of this embodiment will be described with reference to FIG. 2 with a focus on differences between it and the first configuration example. FIG. 2 is a schematic diagram showing the second configuration example of a joint structure of a biped walking robot according to this embodiment.

A joint structure 20 according to the second configuration example has a vertically reversed configuration of the configuration which comprises the links L1 and L3, the slide link L2S, the pivot P2, and the slide pivot PS in the joint structure 10 according to the first configuration example. The joint structure 20 is a configuration in which main parts of the first configuration example are vertically reversed. Therefore, the joint structure 20 includes the pivot PE as an example of the first member, a link L2 as an example of the first link, a slide link L1S as an example of the second link, and the pivot PR as an example of the second member, and the link L3 is connected to the link L2 through the pivot P2. Further, it can be said that the joint structure 20 includes the slide link L1S and the link L2 instead of the slide link L2S and the link L1 in the joint structure 10, respectively, and is a structure in which the positions of the slide pivot PS and the pivot P2 are replaced.

The slide link L1S may be a link having a configuration including a linear actuator in the link L1. Further, the slide link L1S is a link for performing slide driving of the slide pivot PS on the slide link L1S. The linear actuator provided in the slide link L1S may be an actuator capable of changing the length of the slide link L1S, that is, outputting linear motion, and may be composed of, for example, a linear actuator incorporated in the slide link L1S or a rotary actuator and a conversion mechanism from rotational motion to linear motion. That is, the actuator provided in the slide link L1S may be an actuator capable of changing the length of the slide link L1S so that the slide pivot PS, which is an example of the slide part, slides in a direction along the slide link L1S, which is an example of the second link. Further, the link L2 may be a link in which the sliding function of the slide link L2S is removed.

In the joint structure 20, from the viewpoint of the mass distribution of the leg described above, the pivot PR is a member closer to the center of gravity of the biped walking robot than the pivot PE is, and the slide link L1S and the slide pivot PS are positioned closer to the center of gravity. However, a vertically reversed configuration of the configuration which comprises the slide link L1S, the links L2 and L3, the pivot P2, and the slide pivot PS in the joint structure 20 according to the second configuration example may be employed as a joint structure.

As described above, in the second configuration example, as in the first configuration example, a deceleration effect can be obtained in a high-load posture when driving a joint and a range of motion of the joint can be wide without being limited to around 90°.

Third Configuration Example

Figure 3A:
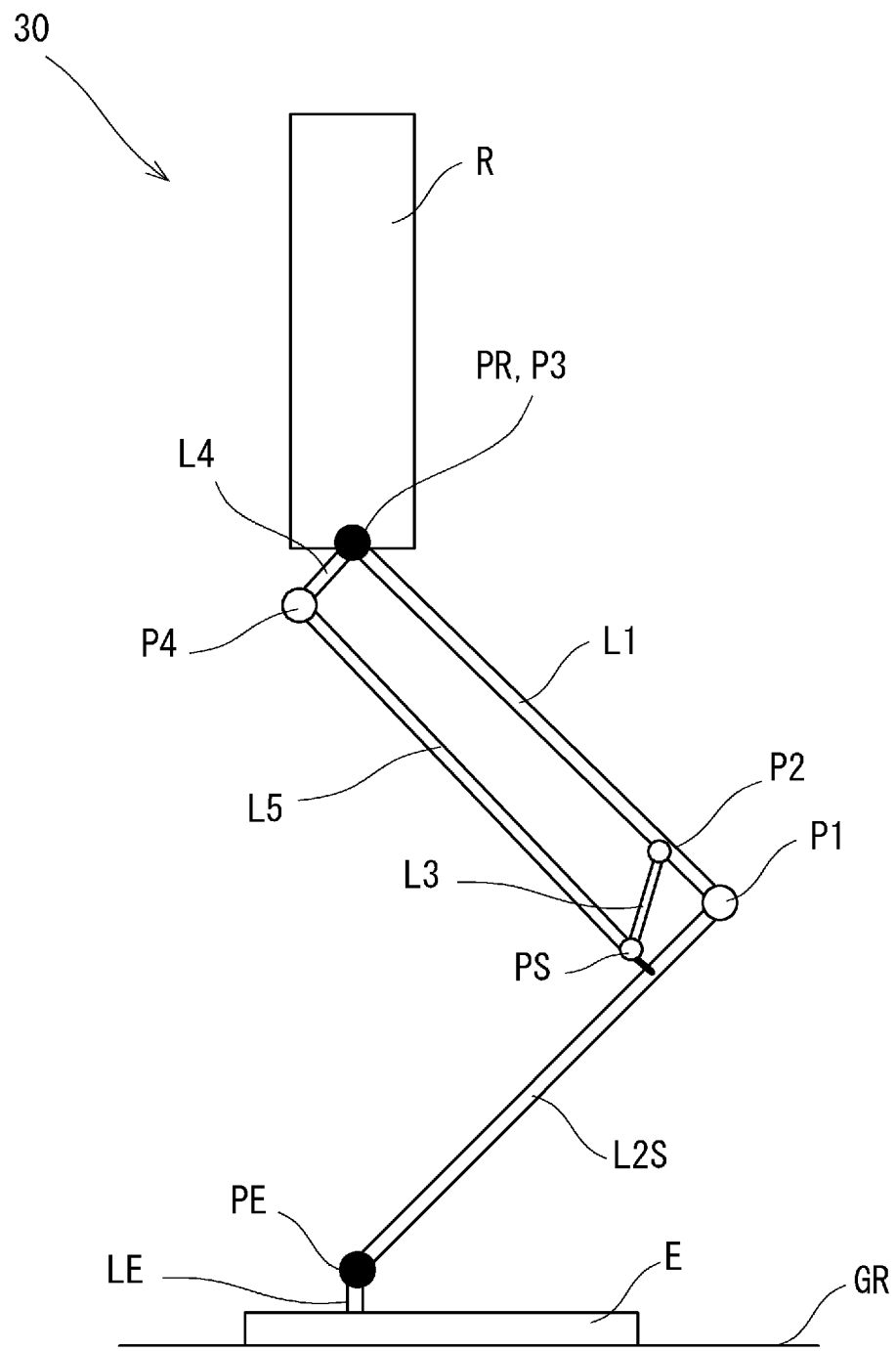
FIG. 3A is a schematic diagram showing a third configuration example of a joint structure of a biped walking robot according to the embodiment.
Figure 3B:
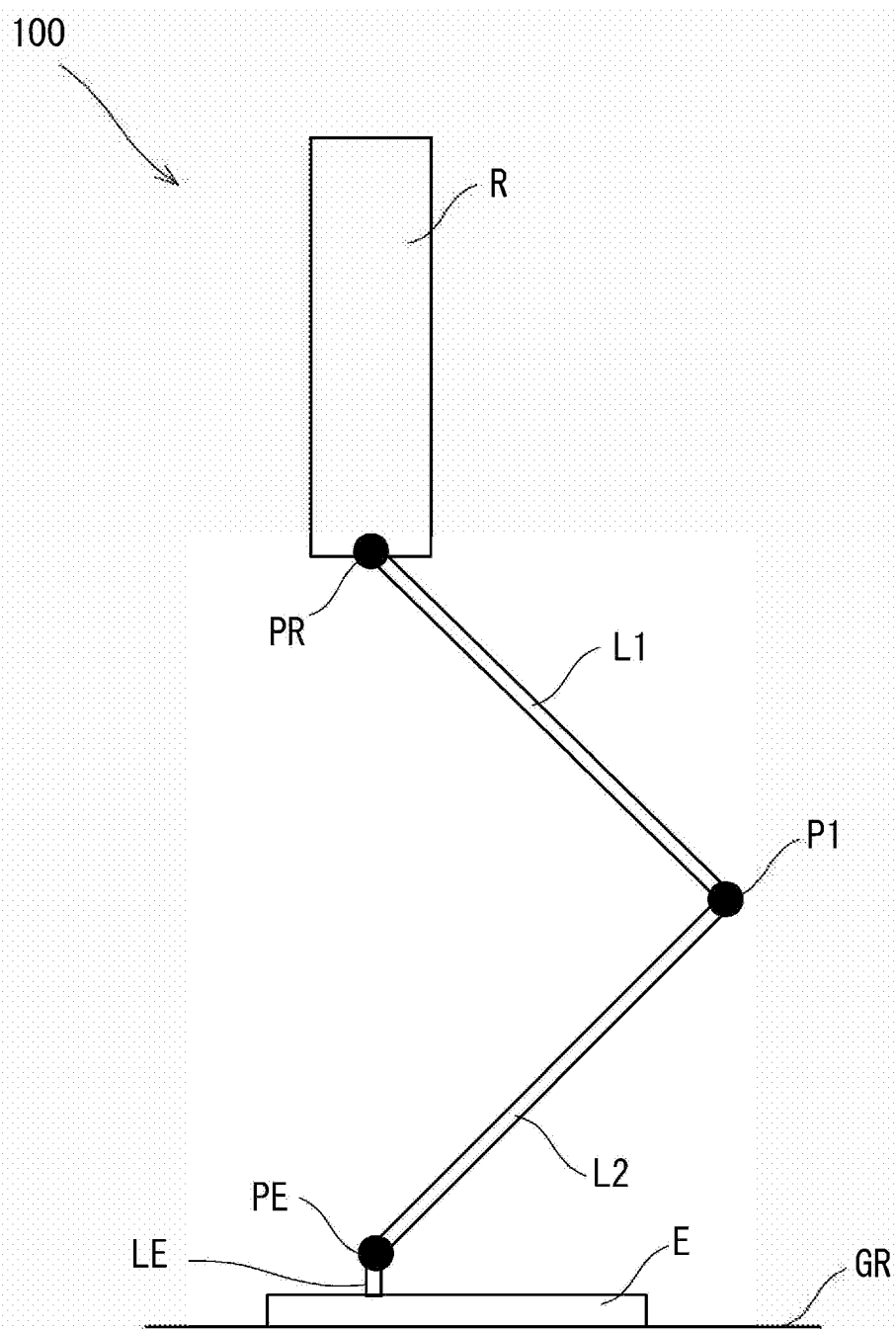
FIG. 3B is a schematic diagram showing a comparative example of the joint structure of the biped walking robot.

The third configuration example of this embodiment will be described with reference to FIGS. 3A to 6 with focus on differences between it and the first configuration example, and it can be similarly applied to the second configuration example. FIG. 3A is a schematic diagram showing the third configuration example of a joint structure in a biped walking robot according to this embodiment. FIG. 3B is a schematic diagram showing a comparative example of the joint structure of the biped walking robot.

In the first configuration example, it is assumed that the joint structure 10 includes a second pivot illustrated in pivot P2 and an actuator that rotates the second pivot. On the other hand, as shown in FIG. 3A, a joint structure 30 according to this configuration example includes, in addition to the second pivot illustrated by the pivot P2, a third pivot, a fourth link, a fifth link, a fourth pivot, and an actuator.

The third pivot is a pivot which is a member connected to a first member and is provided in a member other than a first link, or a pivot which is provided in the first link at a position closer to the first member than the second pivot is. In FIG. 3A, a pivot P3 is used as an example of the third pivot. The pivot P3 is a pivot coaxial with the pivot PR provided in the member R connected to the pivot PR, but it can also be a pivot non-coaxial with the pivot PR.

The fourth link is a link whose one end is connected to the third pivot, and can be exemplified by a link L4. The fifth link is a link whose one end is connected to the slide part, and can be exemplified by a link L5 connected to the slide pivot PS. The fourth pivot is a pivot that connects the other end of the fourth link to the other end of the fifth link, and can be exemplified by a pivot P4 that connects the other end of the link L4 to the other end of the link L5.

The above-described actuator in the joint structure 30 is an actuator that rotates the third pivot, thereby rotating the fourth link relative to the first link, and can be exemplified by a rotary actuator provided in the pivot P3. The rotary actuator provided in the pivot P3 is only required to be capable of rotating pivot P3, thereby rotating the link L4 relative to the link L1. The rotary actuator provided in the pivot P3 may be fixed to the member R to drive the link L4 relatively, or fixed to the link L1 to drive the link L4 relatively.

That is, when the link L1 is considered as a stationary joint, the joint structure 30 may include a four-link structure in which the link L4 is a driving joint, the link L5 is an intermediate joint, and the link L3 is a driven joint. The four-link structure may include the pivots PR, P2, and P4, and the slide link PS.

As described above, the joint structure 30 provides the joint structure 10 having a four-link structure so that the center of gravity of the entire leg is raised, i.e., closer to the hip joint side. As a matter of course, the four-link structure described above does not need to be a parallel link structure. For example, when the link L4 is shorter than the link L3, the deceleration ratio can be set to be higher, and in the reverse case, the deceleration ratio can be set to be lower.

Further, although the joint structure 30 employs a configuration in which the actuator that drives the pivot P2 in the joint structure 10 is transferred to the pivot P3 so as to raise the center of gravity of the entire leg, the actuator that drives the pivot P2 can be used as it is without employing the above configuration in the third configuration example. Further, in the third configuration example, if the inertia of the leg is allowed to be increased, a rotary actuator provided in the pivot P4 installed in a member different from the member R can be employed instead of the rotary actuator provided in the pivot P3.

As described above, in the third configuration example, as in the first configuration example, a deceleration effect can be obtained in a high-load posture when driving a joint and a range of motion of the joint can be wide without being limited to around 90°. Further, in addition to the above effect, the third configuration example can provide an effect that the center of gravity of the entire leg can be positioned higher than that in the first configuration example.

Figure 4:
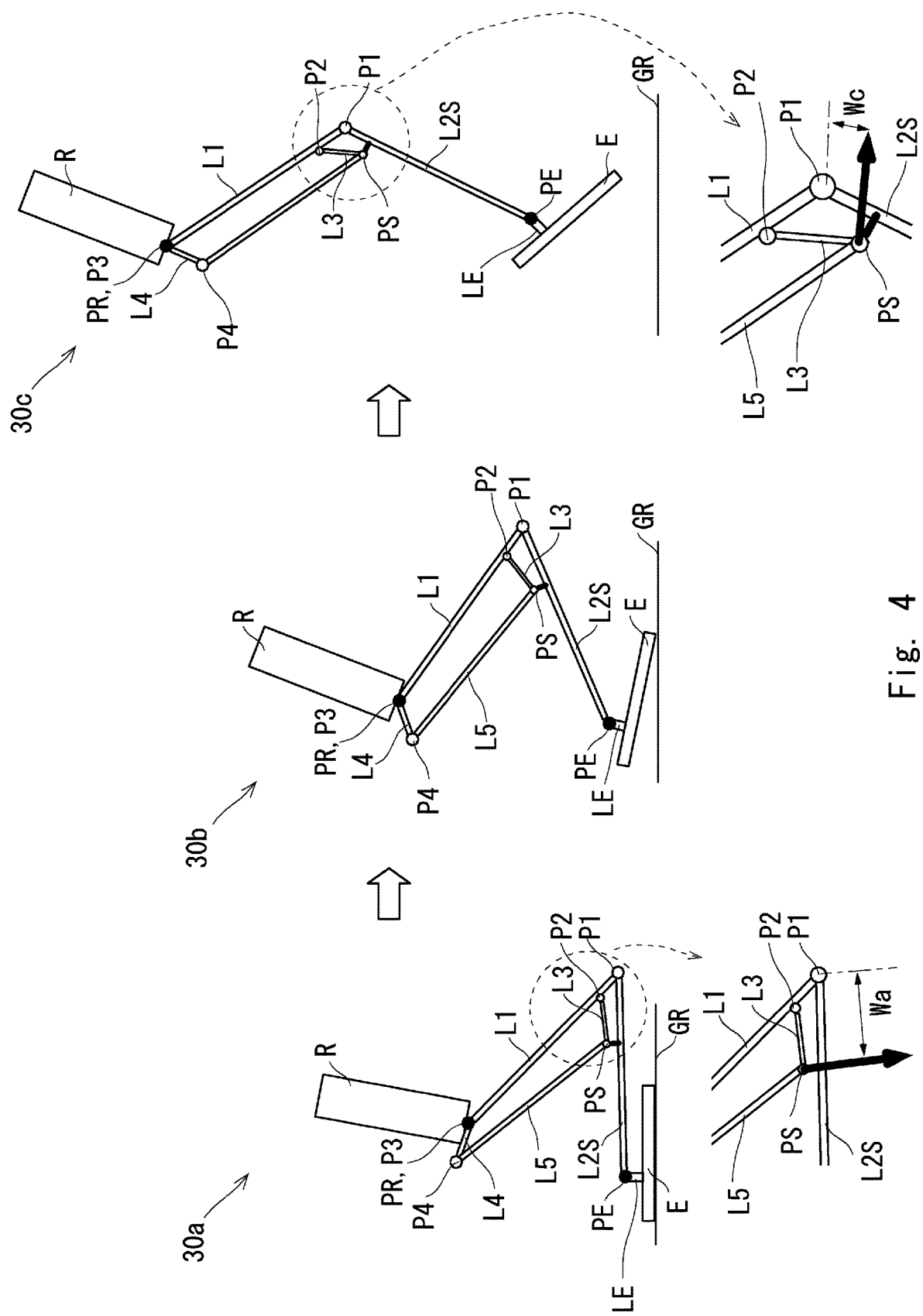
FIG. 4 is a schematic diagram showing a change in a posture during jumping action in the third configuration example of FIG. 3A.
Figure 5:
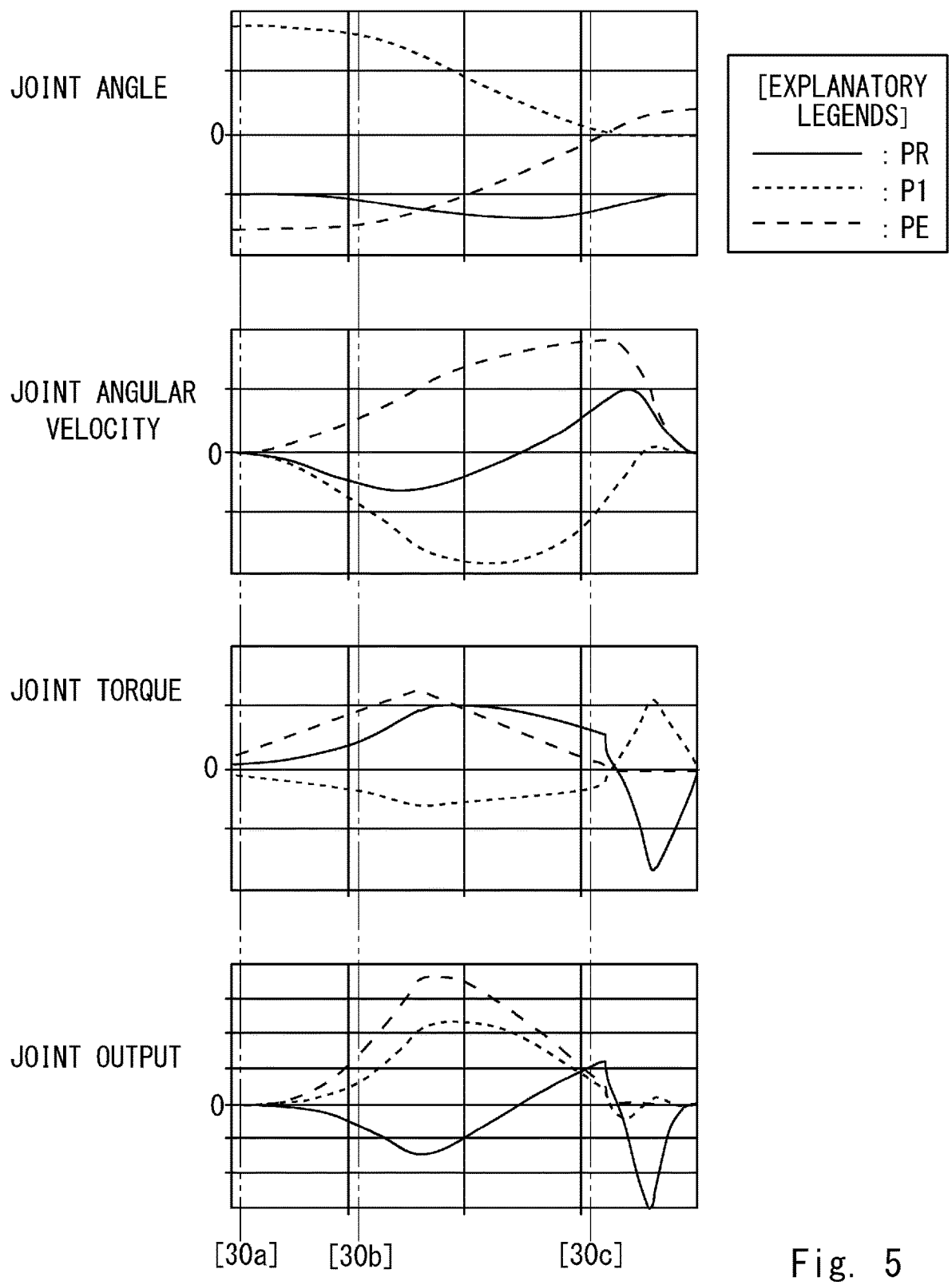
FIG. 5 shows graphs showing results of calculating the displacements of respective joint parameters in accordance with the change in the posture shown in FIG. 4.
Figure 6:
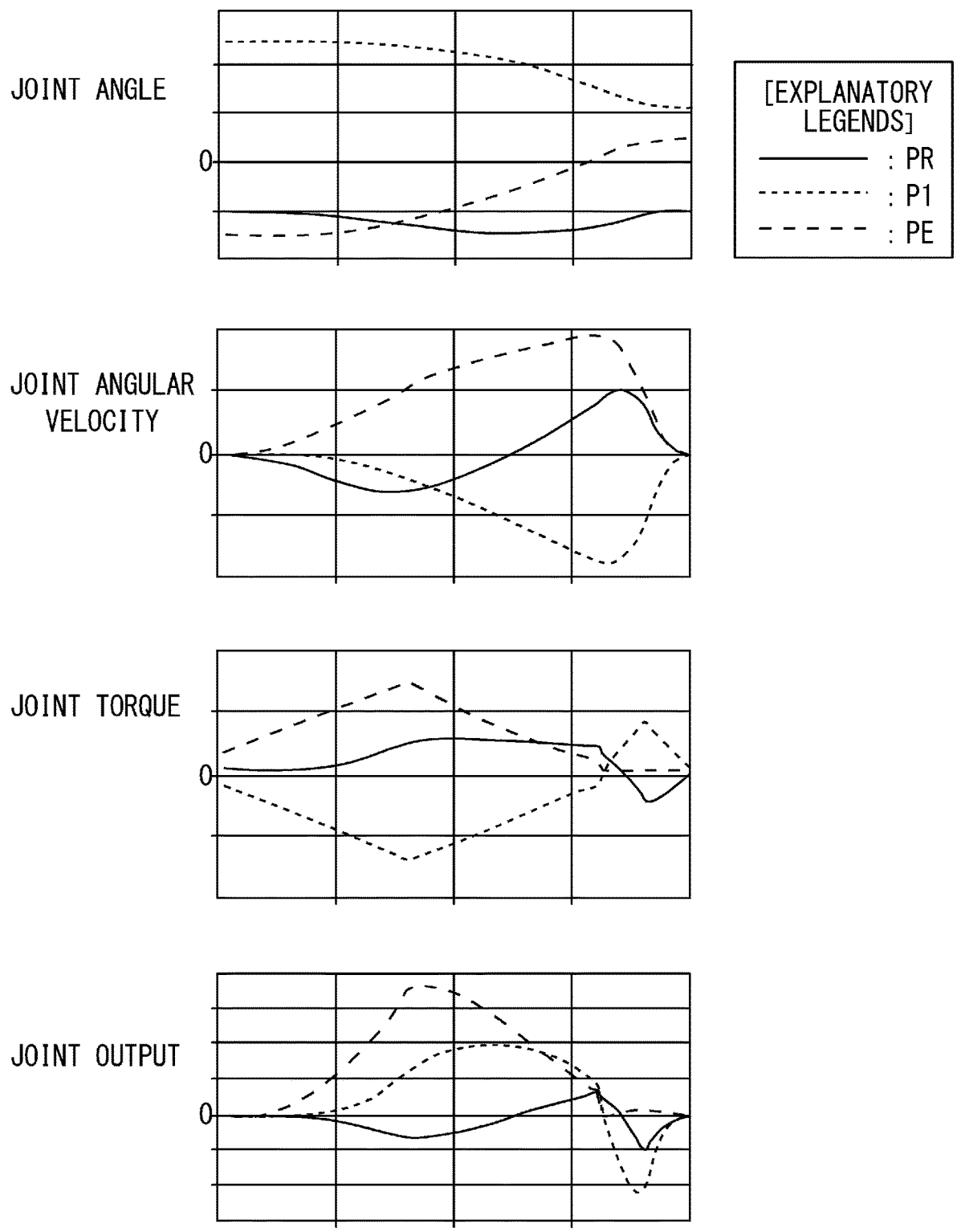
FIG. 6 shows graphs showing results of calculating the displacements of the respective joint parameters in accordance with a change in a posture during jumping action in the comparative example shown in FIG. 3B.

Next, an example of a state of each joint at each timing when jumping is performed as an action that requires high power will be described with reference to FIGS. 4 and 5. FIG. 4 is a schematic diagram showing a change in a posture during jumping action in the third configuration example of FIG. 3A. FIG. 5 shows graphs showing results of calculating the displacements of respective joint parameters in accordance with the change in the posture shown in FIG. 4, and the horizontal axis of each graph indicates time. In FIG. 5 and FIG. 6 which will be described later, the scale of the vertical axes of the respective joint parameters indicate the same range.

In FIG. 4, joint structures 30a, 30b, and 30c respectively show an initial-stage posture, a middle-stage posture and a late-stage posture at the time of a jumping action in the joint structure 30. The joint structure 30a shows a squatting state, the joint structure 30b shows a jumping (leaping) and rising state, and the joint structure 30c shows a fully raised state. Further, regarding dashed circles in initial-stage posture and late-stage posture shown in FIG. 4, the direction of the force acting on the slide pivot PS is illustrated with a bold arrow.

In the joint structure 30, as shown in the joint structure 30a, in initial-stage posture which does not require a large speed but requires a high torque, a distance Wa increases and the output speed for moving the pivot P1 decreases, that is, a link ratio having a high deceleration ratio can be achieved. Further, in the joint structure 30, as shown in the joint structure 30c, in late-stage posture which does not require a high torque but requires a large speed, a distance Wc decreases and the output speed of moving pivot P1 increases, that is, the link ratio having a low deceleration ratio can be achieved. As can be seen from the above facts, in the joint structure 30, in the middle of jumping between the initial-stage posture and the late-stage posture, it is possible to shift speed steplessly as seen from the actuator in accordance with the angle of the pivot P1 which is the knee joint.

FIG. 5 shows the displacements of joint parameters in accordance with the change in the posture during jumping action including the postures indicated by the joint structures 30a, 30b, and 30c. Note that four joint parameters of an angle, an angular velocity, torque, and an output are used as the joint parameters. Further, the graphs shown in FIG. 5, the displacement of each joint parameter for the knee joint, i.e., the pivot P1, is indicated by a dotted line, and the displacements of each joint parameter for the pivot PR and the pivot PE are indicated by a solid line and a dashed line, respectively.

As shown in FIG. 5, in the joint structure 30, it can be seen that the torque of the pivot P1, i.e., the torque of the knee joint, is leveled without having a large peak until the state indicated by the joint structure 30c where the member E comes off the ground. The reason why the peak of torque can be lowered before the member E comes off the ground as described above is that the joint structure 30 has a structure that changes a variable-speed ratio in accordance with the posture, that is, a structure that has a variable-speed effect for the applied torque in accordance with the posture as described above.

The above effect will be explained in comparison with a comparative example shown in FIG. 3B. A joint structure 100 of a biped walking robot according to the comparative example is a serial link structure, and as shown in FIG. 3B, the link L1 and the link L2 are connected through the pivot P1 provided with an actuator. Further, in the joint structure 100, the link L1 and the member R are connected through the pivot PR provided with an actuator. In the joint structure 100, the link L2 and the link LE are connected through the pivot PE provided with an actuator, and the member E for grounding it to the ground GR is connected to the link LE.

The graphs of FIG. 6 shows t results of calculating the displacements of the respective joint parameters in accordance with a change in a posture during jumping action in the comparative example shown in FIG. 3B. In the graphs of FIG. 6, four joint parameters of an angle, an angular velocity, torque, and an output are used as the joint parameters, and the displacements of the joint parameters for the pivot PR, the pivot P1, and the pivot PE in the joint structure 100 are indicated by a solid line, a dotted line, and a dashed line, respectively. The horizontal axis of each graph in FIG. 6 indicates time.

As shown in FIG. 6, in the joint structure 100, it can be seen that the absolute value of the torque of the pivot P1 increases from the state of the initial-stage posture to the state of the middle-stage posture, and that a high speed is required near the timing of the state of the late-stage posture where the member E comes off the ground. In the graphs of FIG. 6, it can be seen that a required torque of the pivot P1 is higher and the peak of the torque is larger than in the case of the graph shown in FIG. 5 according to this configuration example.

With regard to the required torque of the pivot P1, the joint structure 100 having a large absolute value of the torque shown in FIG. 6 requires a larger actuator than that of the joint structure 30 having a small absolute value of the torque shown in FIG. 5, which is disadvantageous both in terms of total mass and mass distribution. Further, with regard to the required torque of the pivot P1, the joint structure 100 having a large peak of the torque shown in FIG. 6 requires a higher mechanical strength than that of the joint structure 30 that has a smaller peak and is leveled as shown in FIG. 5. In other words, the joint structure 30 is preferable to the joint structure 100 both in terms of total mass and mass distribution, and in addition, it requires less mechanical strength.

The mass distribution will now be described in a supplementary manner. For a robot having a leg structure, it is important to increase the power-to-weight ratio of the robot in order to demonstrate a high motion performance such as running and jumping. In particular, in the leg structure, it is desirable that not only the total mass be light, but also the mass distribution be light as it goes from the crotch part to the foot part of the leg. In the knee structure, it is common, for example, that the knee joint is directly driven by a rotary actuator or that the thigh and the shin are driven by connecting them by a direct motion actuator. However, when the knee of the leg is in a flexed state, the torque required by the actuator is high against the load, and when the knee is close to an extended state, the speed is required. This tendency becomes more pronounced as a motion performance increases.

However, the joint structure 30 has a variable-speed structure according to the posture with a simple configuration as described above, and has a structure suitable for the mass distribution of the legs while preventing the increase in the size by leveling the load of the actuator. Therefore, it can be said that the joint structure 30 is preferable to the joint structure 100 in terms of the mass distribution.

The above effect, in addition to the joint structure 30, can be obtained in the third configuration example to which other application examples are applied, as well as in other joint structure according to this embodiment described in the first and the second configuration examples.

Further, the joint structure according to this embodiment is not required to adopt a double-angle structure using gears or the like in a largely movable joint such as a knee. Since it is practically difficult to achieve zero backlash in a structure in which interlocking is performed by gears, there are restrictions such as that a control gain cannot be increased due to rattling of the joint. However, in the joint structure according to this embodiment, there are no restrictions described above. Further, in the case of a high-power robot, relatively large steel gears may be required for strength reasons, which may increase the weight thereof. However, in the joint structure according to this embodiment, the above large steel gears are not required.

Note that the present disclosure is not limited to the above-described embodiment and may be changed as appropriate without departing from the scope of the present disclosure. For example, regarding various types of joint structures according to the above embodiment, an example of a case in which the pivot P1 of the knee joint is one revolute joint has been described. However, the present disclosure is not limited thereto. For example, various types of structures such as a multi-joint link mechanism and a double joint in which the link L1 and the slide link L2S or the slide link L1S and the link L2 can be flexed and extended relatively may be employed.

Further, for example, although various types of joint structures according to the above embodiment have been described in accordance with the assumption that the robot is a robot capable of walking on two legs, the present disclosure is not limited thereto and various types of robots can be applied, such as a robot that moves while jumping on one leg, a robot that walks on three or more legs, e.g., four legs, and a robot that has one or more arms. Further, the description has been given in accordance with the assumption that the joint structure is applied to a knee as a joint. However, it can also be applied to other joints such as an ankle joint. For example, when a robot has an arm with or without a leg, the above joint structure can be applied to at least one of an elbow and a wrist, which is also referred to as a hand joint, in a robot that performs an action such as throwing an object with a hand part thereof. Further, the robot may be an autonomous mobile robot, a robot remotely controlled by a user, a robot piloted by a user riding thereon, or a robot having more than one of these functions. Further, there is no particular limitation on the appearance of the robot.

Note that the robot may include a sensor group for detecting the robot's posture etc., and a control unit that controls the driving of one or a plurality of actuators included such as the above-described actuator. Note that the sensor group may be composed of a plurality of sensors that detect positions, angles, and the like of the robot at various places and transfer them to the control unit, and a group of sensors of any type by which the robot's posture can be detected directly or computationally may be used. The control unit may be a part that controls actions of the robot including a driving control of the actuator, and may be a part that controls the whole robot. The control unit may be implemented by, for example, an Integrated Circuit. For example, it may be implemented by a processor such as a Micro Processor Unit (MPU) or Central Processing Unit (CPU), a work memory, a nonvolatile storage device, and the like. A program for control executed by the processor is stored in the storage device, and the processor loads the stored program into the work memory and executes it, thereby performing the function of the robot.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A joint structure of a robot, comprising:
a first link, one end of the first link being directly connected to a first member;
a second link, one end of the second link being directly connected to the first link and an other end of the second link being directly connected to a second member;
a first pivot configured to directly connect an other end of the first link to the one end of the second link;
a third link, one end of the third link being directly connected to the first link at a position near the first pivot;
a slide part directly connected to the second link so as to be slidable;
a second pivot configured to directly connect the one end of the third link to the first link at the position near the first pivot;
a third pivot, the third pivot being provided in a member that is connected to the first member, or being provided in the first link at a position closer to the first member than the second pivot is,
a fourth link, one end of the fourth link being directly connected to the third pivot;
a fifth link, one end of the fifth link being directly connected to the slide part;
a fourth pivot configured to directly connect an other end of the fourth link to an other end of the fifth link; and
an actuator configured to rotate the third pivot, thereby rotating the fourth link relative to the first link,
wherein an other end of the third link is directly connected to the slide part.

2. The joint structure according to claim 1, comprising a linear actuator configured to slide the slide part in a direction along the second link.

3. The joint structure according to claim 1, wherein the first member is a member closer to a center of gravity of the robot than the second member is.

* * * * *